United States Patent [19]
Drenth

[11] Patent Number: 5,788,401
[45] Date of Patent: Aug. 4, 1998

[54] ROD JOINT

[75] Inventor: Christopher L. Drenth, North Bay, Canada

[73] Assignee: Boart Longyear International Holdings, Inc., Salt Lake City, Utah

[21] Appl. No.: 772,860

[22] Filed: Dec. 24, 1996

[51] Int. Cl.⁶ .................................................. B25G 3/00
[52] U.S. Cl. ...................... 403/343; 403/353; 285/334; 285/332.3
[58] Field of Search .......................... 403/343, 353; 285/334, 332.3, 390

[56] References Cited

U.S. PATENT DOCUMENTS

| | | |
|---|---|---|
| 4,161,332 | 7/1979 | Blose . |
| 4,384,737 | 5/1983 | Reusser . |
| 4,410,204 | 10/1983 | Reimert . |
| 4,508,375 | 4/1985 | Patterson et al. ............ 285/334 |
| 4,548,431 | 10/1985 | Hall et al. . |
| 4,550,937 | 11/1985 | Duret ............................ 285/334 |
| 4,600,225 | 7/1986 | Blose . |
| 4,865,364 | 9/1989 | Nobileau ....................... 285/334 |
| 4,944,538 | 7/1990 | Read .............................. 285/334 |
| 5,092,635 | 3/1992 | DeLange et al. . |
| 5,127,784 | 7/1992 | Eslinger ...................... 285/334 X |
| 5,358,289 | 10/1994 | Banker et al. ................. 285/334 |
| 5,419,595 | 5/1995 | Yamamoto et al. ........... 285/334 |
| 5,454,605 | 10/1995 | Mott . |
| 5,498,035 | 3/1996 | Blose et al. ................. 285/334 X |

Primary Examiner—Daniel P. Stodola
Assistant Examiner—Bruce A. Lev
Attorney, Agent, or Firm—Clayton R. Johnson

[57] ABSTRACT

Joints for coupling the box and pin ends of drill rods and casings, particularly for the mineral exploration industry, have single start, helical tapered threads extending axially intermediate cylinder sections. The threads have frustoconical crests and roots with the taper being about 0.75 to 1.6 degrees. The threads are of a pitch of about 2.5 to 4.5 threads/inch, have negative pressure flank angles of about 7.5 to 15 degrees relative to a perpendicular to drill string central axis and clearance flanks of an angle of at least 45 degrees to aid in maintaining the joint in a coupled condition, even under overload, and facilitate joint make up. Also, the box and pin have shoulders tapered at about 5 to 10 degrees. Additionally, the pin crests have an interference fit with the box roots while the box crests are radially spaced from the pin roots to provide a rigid joint while leaving a space for debris and pressurized lubricant.

14 Claims, 4 Drawing Sheets

FIG. 1
FIG. 2
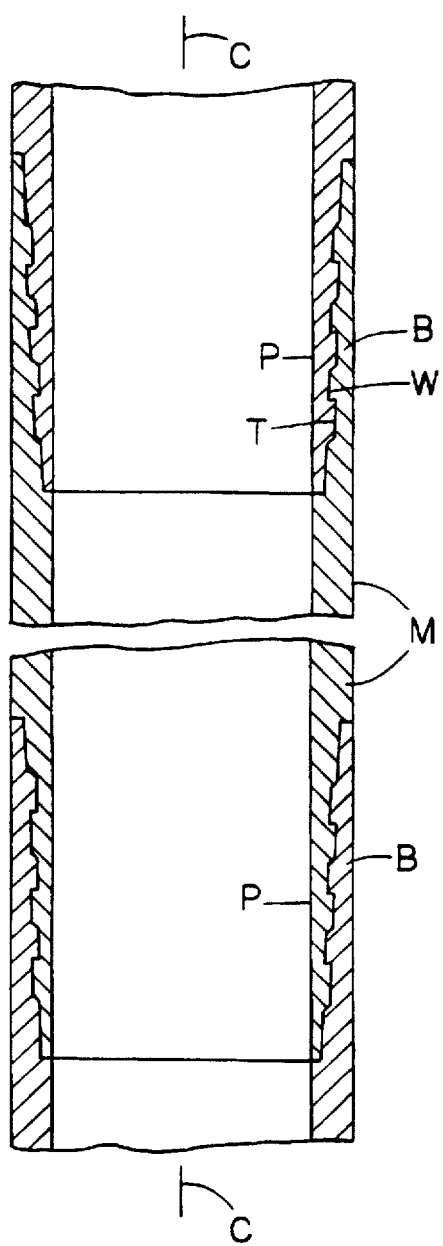
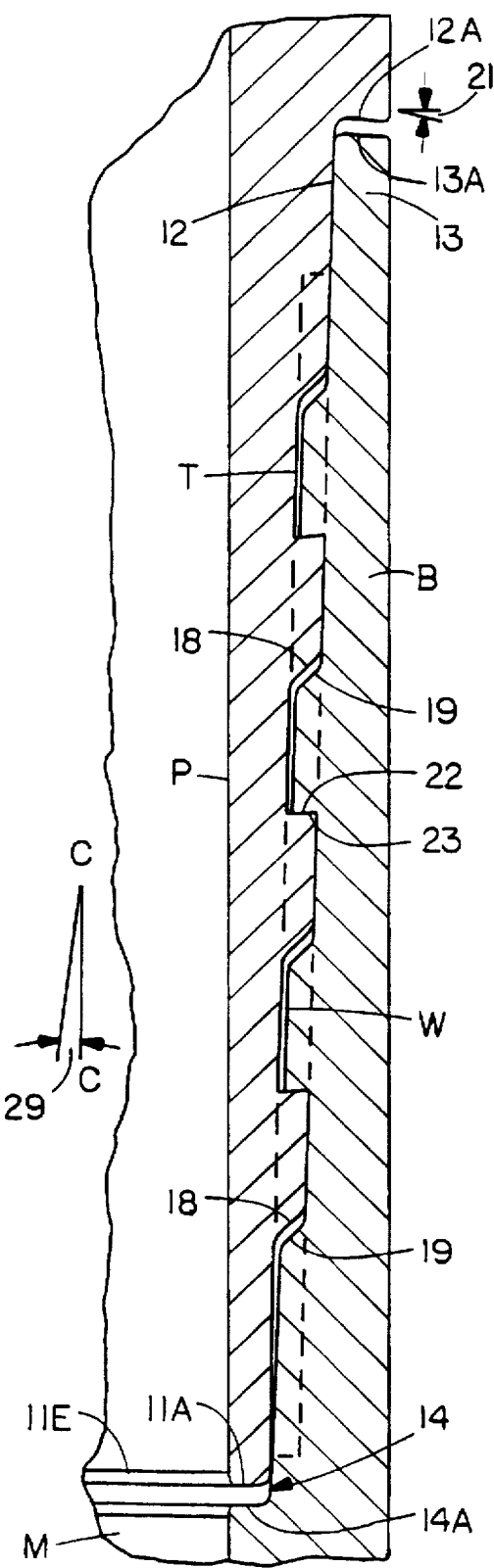

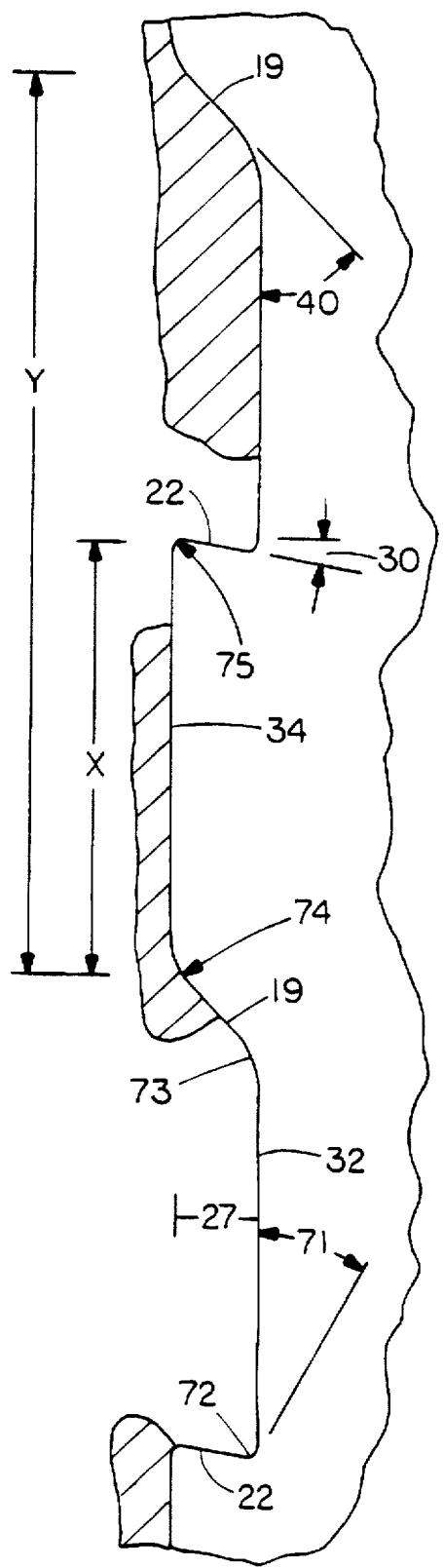

FIG. 6
FIG. 7
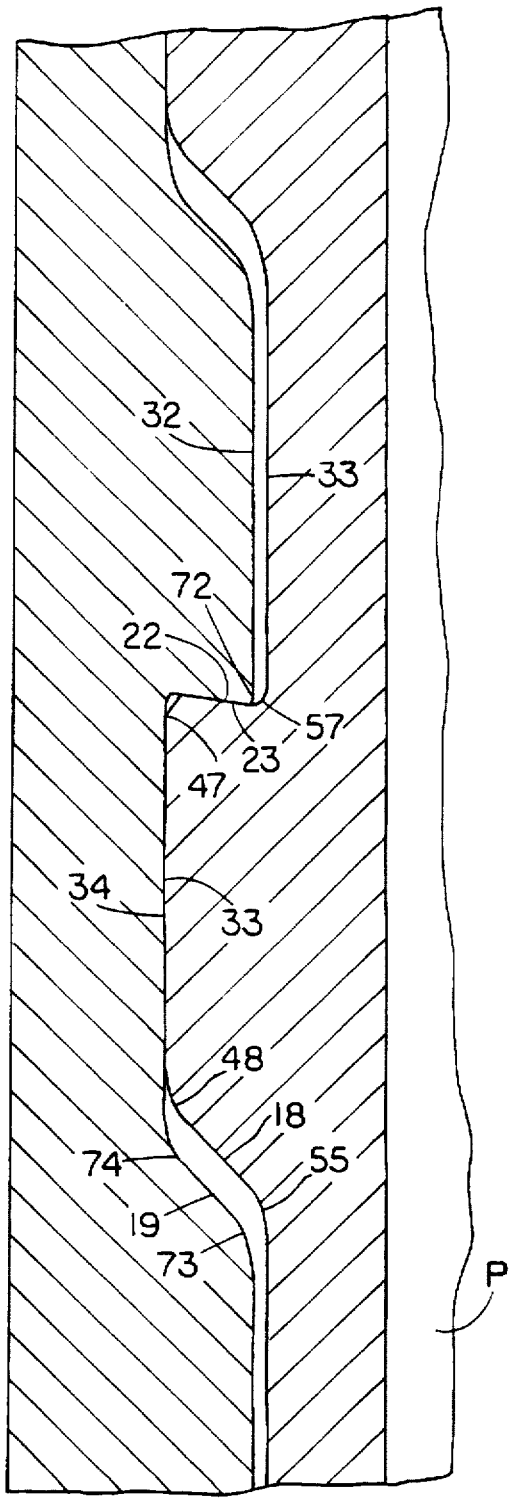
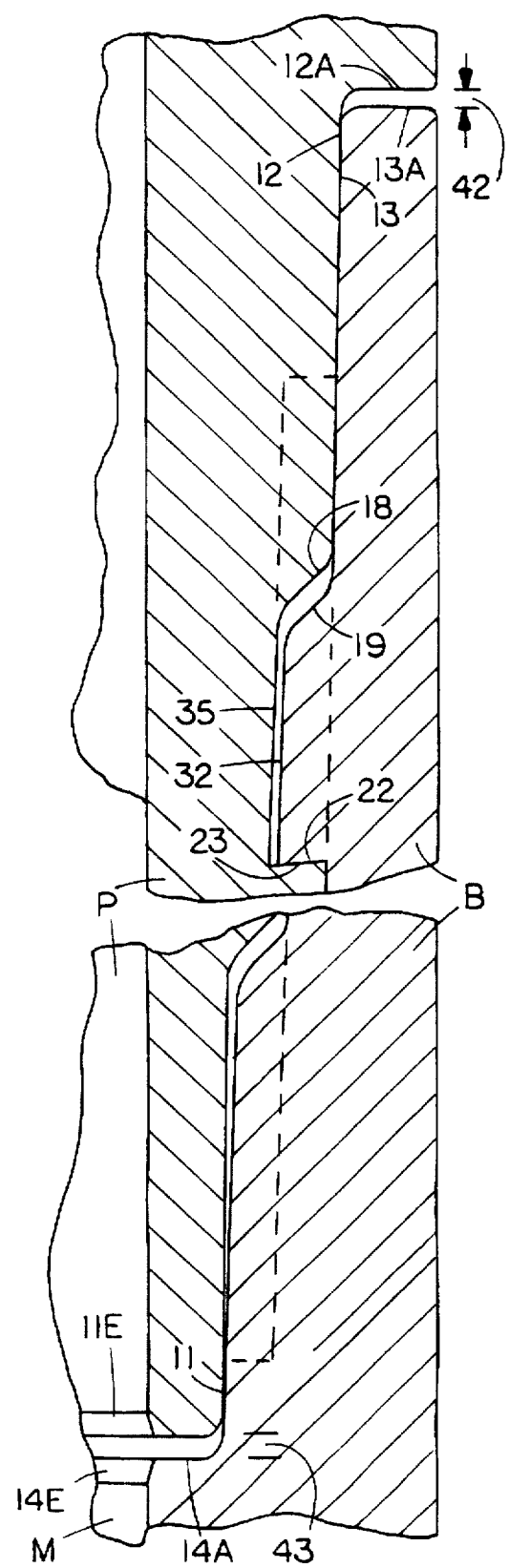

ROD JOINT

BACKGROUND OF THE INVENTION

This invention relates to drill rods and casings which are used in standard lengths and, in particular, to thin wall threaded drill rod and casing joints used in surface or underground diamond drilling in the mineral exploration industry.

The joints of the drill string transfer the torque required to twist the drill string and turn the diamond bit. As the drill string becomes longer, its weight becomes greater than the drilling thrust and an increasing pullback tension load is required at the end of the drill string opposite the drill bit to maintain the desired drilling thrust at the bit. Thus, deep hole drilling requires a joint with a high tension load capacity. Additionally, tension loads applied to retrieve "stuck" drill strings often exceed operating tension loads during the rotation of the drill bit while drilling. Further, the joint must withstand innumerable makes and breaks (coupling and uncoupling) since the same length drill rod may be installed and removed from a drill string in drilling a bore hole as well as being used in drill strings at different locations during its life span. Also, the making and breaking of the joint must be easy and fast as productivity is sensitive to this operation.

Usually in the mineral exploratory industry the tubing wall thickness is much less than petroleum industry tubing, the petroleum industry tubing allowing for increase in wall thickness at the joint through internal or external upsets or couplers which accommodate more tapered thread turns and/or greater thread depths without affecting critical parts of the pin or box. Thus, the petroleum industry can use longer joints and various thread profiles and shoulders intermediate the ends of the joint that do not provide suitable joint strengths and durability for deep drilling in the mineral exploration industry within the parameters of the tubing used for mineral exploratory industry. Further, providing seals in the joints is of importance in the oil and gas industry to prevent loss of product and/or contamination of product from leakage, while it is not as critical in the mineral exploratory industry wherein radial shoulder seal(s) serves merely to maintain sufficient water (drilling fluid) pressure to prevent burning of the drill bit and wash debris away from the bit.

Also, in the mineral exploratory industry, some bore holes are purposely deviated from a straight line direction to explore an ore body while some bore holes are not uniform, for example become washed out, both of which allow the drill string to whip. As a result, the joint may be subjected to alternating stresses in combination with large mean stresses, requiring a high fatigue strength.

Additionally, in mineral exploratory drilling, proper making up of joints involves slow speed pre-torquing and small stabbing forces, in comparison to that in the petroleum industry, are utilized. Also, in the mineral exploratory industry, desirably lighter weight, slim-hole thin wall tubing is used. Thus, no alignment guides are required.

In the mineral exploratory industry, mineral core samples are retrieved through the inner-diameter of the drill string with "in-the-hole tooling", for example wire line core barrel inner tube assemblies. As there is a small clearance annulus between the bore hole and the outer diameter of the tubing, and typically since the hole is not straight, the radial outer surface of the joint suffers from wear due to hole abrasion. Thus, any deformation of the joint into the interior of the tubing may prevent core or in-the-hole tool retrieval while any deformation outside the joint normal outer diameter, for example belling radially outwardly, will increase wear and decrease the life of the drill rod or casing joint.

Further, for recovery of core during exploratory earth drilling operations, it is highly desirable to obtain the maximum diameter of core per a given diameter bore hole and at the same time minimize non-productive drilling time which occurs during the movement of the drilling tool between the drilling surface and the axial inner end of the bore hole (drill bit end). With thicker wall tubing, the diameter of core relative to the diameter of the bore hole is reduced and/or the annular clearance space between the drilling tool and the drill string is reduced.

Some conventional size wireline diamond drill rods are of outer diameters of 2¾" to 3½". For such standard size drill rods, the wall thickness is about 0.19" to 0.22", the wall thickness being about 6–7% of the respective drill rod outer diameters.

In order to provide tubing joints usable in the mineral exploratory industry for thin wall tubing used as drill rods and casings that are stronger and withstand the stresses encountered, particularly during deep hole drilling, and to facilitate make-up and break-out and decrease the likelihood of spin-out, this invention has been made.

SUMMARY OF THE INVENTION

Tubing (drill rod and casing) for mineral exploratory are thin walled and have pins (male members) and boxes (female members) with internal circular cylindrical surfaces extending axially between axially intermediate threaded sections to the respective adjacent nose end shoulders and base shoulders with the shoulders being tapered about 5 degrees to 10 degrees relative to a perpendicular to the joint central axis. The threaded section of each of the box and pin is tapered with the respective thread being of a substantially constant depth throughout its circumferential length between the pin and box cylinder sections and the crest and root respectively being of a constant width through out their circumferential lengths (turns of thread) other than at their juncture to the sections having the cylindrical surfaces. The depth of the box and pin threads are of relative thickness dimensions such that the pin crest abuts against the box root while leaving a radial gap between the box crest and the pin root. The box and pin threads have pressure flanks of about a negative 7.5 to 15 degrees to provide for lower stress states and clearance flanks of about 45 degrees to 60 degree to facilitate stabbing without damaging the threads.

BRIEF DESCRIPTION OF THE DRAWINGS

FIG. 1 is a fragmentary longitudinal sectional view through a plurality of connected drill rods in a drill string with a longitudinal intermediate portion of one of the drill rods being broken away;

FIG. 2 is an enlarged, fragmentary, longitudinal sectional view of one of the rod joints of FIG. 1, the dotted lines indicating the location of the crests and roots of threads diametrically opposite those shown in solid lines and the joint being shown in a hand tight condition;

FIG. 4 is a fragmentary longitudinal sectional view showing the profile of the threads of a box of FIG. 1, the showing being on the diametric opposite side of the joint from the showing in FIG. 2;

3

Figure 3:
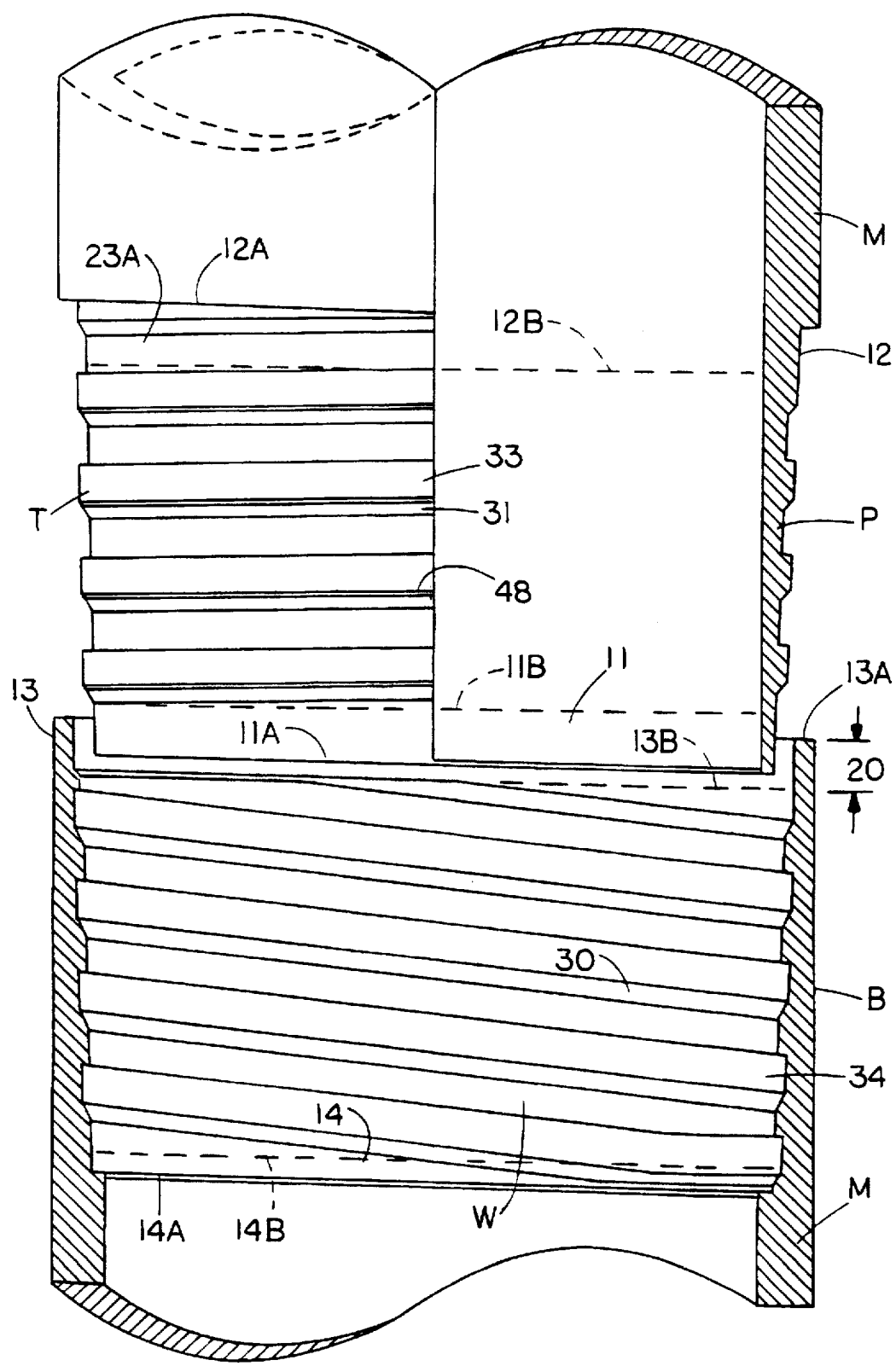
FIG. 3 is a fragmentary longitudinal view of pin end of a drill rod partially extended into the box end of an adjacent drill rod with the box and one half of the pin being shown in cross section and the joint being shown in a loose condition.

FIG. 5 is a fragmentary longitudinal sectional view showing the profile of the threads of a pin of FIG. 1, the showing being on the diametric opposite side of the joint from the showing in FIG. 2;

FIG. 6 is a further enlarged, fragmentary longitudinal sectional view of the threaded joint of FIG. 3; and FIG. 7 is an enlarged view of the cylinder end portions of a rod joint of FIG. 3 with an intermediate portion broken away, the dotted lines indicating the location of the crests and roots of threads diametrically opposite those shown in solid lines.

DESCRIPTION OF THE PREFERRED EMBODIMENT

Referring to FIG. 1, each casing or drill rod (tubing) has a main body portion M extending between its box (female member) B and its pin (male member) P wherein the main body may be of the same outer diameter as that of the box and the same inner diameter as that of the pin, or internally upset wherein the main body has a larger internal diameter than that of the box and pin with no increase in wall thickness, or a composite tubing wherein the box and pin end portions are joined to a main body after being formed. The outer diameters of the tubing are of an industry standard which are restricted by drilling equipment standards while the inner diameters have an industry standard minimum size to allow passage of industry standard core sample tooling sizes. However, the inner diameter can be oversized with accompanying decreased wall thickness within limits referred to herein. The resulting wall thickness can be varied within limits with standard O.D. size. The casing wall thickness is thicker and of larger diameter than drill rod tubing since it is typically used to "case" overburden holes, in order to pass drill rods therethrough, or for soil "hammer" testing.

The thin wall thickness of the tubing, which in turn limits the thickness of the cylinder end sections 13 and 14 limits, directly or indirectly, the allowable ranges for the parameters of the pin and box described herein.

Each pin P includes an end cylinder section 11 and a base cylinder section 12 with a single start, tapered pin thread T extending between the cylinder sections 11 and 12 while each box B includes an end cylinder section 13 and a base cylinder section 14 with a single start, tapered thread W extending between cylinder sections 13 and 14. The cylinder sections 11 and 13 extend axially between the pin end (nose) shoulder 11A and the dotted line 11B (see FIG. 3) and the box end (nose) shoulder 13A and the dotted line 13B respectively. Each of the nose end cylinder sections 11 and 13 has a substantially constant internal diameter (circular cylindrical) throughout substantially its entire axial length, i.e. the radial inner and outer surfaces respectively being of substantially constant radial inner and outer diameters throughout their axial lengths. The pin and box base cylinder sections 12 and 14 extend axially between the pin end shoulder 12A and the dotted line 12B and the box end shoulder 14A and the dotted line 14B respectively.

The dotted lines 11B, 12B, 13B and 14B designate the ends of the respective cylinder section that is axially opposite the cylinder ends adjacent shoulders 11A, 12A, 13A and 14A respectively. The shoulders are frustoconical surfaces that are tapered radially inwardly in a direction axially away from the box base shoulder toward the end of the drill string at the drilling surface (not shown). The base cylinder sections are of constant external and internal diameters throughout their axial lengths, other than for the portions 23A of the

4 threads formed therein. With reference to portions 23A, it is to be noted that the one terminal ends of the threads is axially intermediate the base cylinder section ends while the helical opposite ends of the threads are adjacent to cylinder sections ends 11B and 13B respectively. Thus the crest portions of the threads located between the axially opposite ends of cylinder sections 12 and 13 are cylindrical rather than being tapered. However, in usage, such cylindrical thread section are radially adjacent to cylinder sections of the other of the pin and box respectively.

By not tapering the end cylinder sections, the wall thickness is not decreased such as would otherwise occur with the accompanying reduced compressive strength while by not tapering the pin and box base cylinders, the wall thickness thereof is not decreased such as would otherwise occur with the accompanying reduction in tensile strength. However, the wall thickness of the cylinder sections does limit the joint taper for a given thread length.

The thickness of the box end cylinder section 13 is greater than that of the pin end cylinder section 11 to allow for greater wear to the joint outer diameter resulting from in the hole abrasion. This results in the joint having an increased life.

The pin and box end cylinder sections terminal nose end shoulders 11A and 13A respectively which are substantially frustoconical are joined to the radially inner and radially outer cylinder surfaces of the cylinder sections by rounded and/or chamfered surface portions respectively. Similarly, the pin and box base cylinder sections have frustoconical surfaces (shoulders) 12A and 14A respectively joined to the cylinder section radially outer and radially inner cylinder surface respectively by rounded and/or chamfered surface portions axially opposite the respective nose surface. Advantageously, the radial component of the round and/or chamfered surface portions which join the shoulder to the cylinder section inner and outer cylinder surfaces is less than 15 percent of the tapered dimension of the adjacent shoulder of the respective cylinder section.

The cylinder section nose frustoconical surface 13A mates with the base frustoconical surface 12A upon joint makeup and compress to oppose the tension induced in the pin when the joint is pre-torqued as well as to withstand any compression loads on the drill string, it subsequently being noted the threads do not hold compressive loads since the clearance flanks 18, 19 of the threads do not mate when the joint is made up. The cylinder section nose frustoconical surface 11A may also mate with the base frustoconical surface 14A upon high torque loads or high compression loads. Such compressive loads result from, for example, drilling thrust on joints near the drill bit (not shown) on the drill string or "hammering" loads applied to the casing for soil testing. The interfaces of the nose surfaces (11A and 13A) with the base frustoconical surfaces (14A and 12A) when mated transfer a significant portion of the torsion load in the drill string through the joint and thereby minimize torsional stresses on the pin.

The radial outer cylinder section surfaces (shoulders) 12A, 13A are tapered at an angle 21 (see FIGS. 2 and 7) of about 5 to 10 degrees with reference to a perpendicular to the joint central axis C—C (longitudinal axis of the drill rod) such that any joint deformation is directed generally radially inwardly by their tapered interface to avoid in hole abrasion. The angle is small to avoid inducing extraneous bending stress into the box cylinder section from the shoulder interface normal forces. Also, the cylinder section shoulders are toleranced such that any induced bending stresses bend the cylinder sections 12, 13 into the joint wall instead of "belling" out. A small chamfer 11E and 14E may be provided to respectively join shoulder 11A to the internal circumferential wall of the pin and shoulder 14A to the internal circumferential wall of box.

The radial inner shoulders 11A, 14A are also tapered at 5 to 10 degrees as measured from a perpendicular to the joint central axis whereby any deformation of cylinder sections 11, 14 is directed inwardly by the tapered interface to avoid "snagging" in-the-hole tooling as the tooling is moved in the drill string adjacent to the joint. Additionally, the axial length of the pin is shorter than the box, for example about 0.002 to 0.004, of an inch to ensure that the pin end shoulder 11A does not mate with the box base shoulder 14A until the joint is subjected to high torque load or high compression load conditions.

For joints of this invention, preferably the minimum axial length of a cylinder section (axial distance from a shoulder along the radial inner surface to the mostly closely adjacent part of the thread) that has been designed 20 for cylinder section 13, is about 0.15" for a 4 tpi thread width which is needed to provide sufficient room for the thread cutting tool to leave the tapered section of the joint and pull the tool out of the cylinder section. The axial lengths of the cylinder sections 12, 13 must be equal for them to mate other than at the thread pull out sections 23A. The maximum length of the cylinder sections is about 0.20" for a 3 tpi thread width for drill rods and 0.24" for a 2.5 tpi thread width for large casings. The longer the cylinder sections 11, 13 are, the greater the chance of harmful bending or buckling stresses being induced by the mating joint surfaces.

The axial length of cylinder section 13 is substantially the same as that of cylinder section 12 and thus when the joint is made up, the thread portion 23A is radially opposite the internal surface circular cylinder surface of cylinder section 12. Similarly, the axial length of cylinder section 11 is substantially the same as that of cylinder section 13 and thus when the joint is made up, section 11 is radially opposite a threaded portion of the box. Further, other than for the axial components of any chamfer and rounded surface at the terminal end portions of the box and pin, which usually is substantially less than 10 percent of the axial lengths of the cylinder sections, the cylinder sections 11 and 13 are of substantially constant wall thickness.

The threaded portions of the joint which are between the cylinder sections are conical with a slight taper with the thickest portions of the threaded section being axially adjacent to the base of the respective pin and box. The proper degree of taper of the threads is of importance in that in making up the joint, the end of the pin can be inserted into the end of the box with a large clearance allowing for significant initial axial and concentric misalignment. The clearance gradually decreases as the conical surfaces of the pin and box approach one another. Preferably, the minimum taper 29 of the joint, disregarding tolerancing, is 0.75 degree to appreciate make-up ease and thread engagement distribution, although the minimum could be as low as 0.5 degrees. The minimum taper is an important factor in defining the maximum allowable length of a joint for a given unthreaded circular cylindrical pin or box wall (blank) thickness. The maximum taper of the joint threads is limited by the tubing wall thickness, the thickness of cylinder section, the height of the thread and the thread length. The maximum taper for thinner walled tubing is 1.3 degrees while the taper on thicker wall tubing can be as large as about 1.6 degrees.

There are three primary advantages derived from using the appropriate taper. One is that when making up the joint, the terminal end of the pin can be inserted into the end of the box with a large clearance allowing for significant initial axial and concentric misalignment. The clearance gradually decreases as the conical surfaces of the threads approach each other. This facilitates making up a joint.

A second feature of using tapered joints is the equallization of stress distribution along the thread length. In all threaded joints, the pin is in tension so the pin thread helix elastically spreads apart (pitch decreases) while the box is in compression so the box thread helixes elastically compress together (pitch increases). As a result, the load is no longer spread along the length of the thread but is concentrated at the first part of the pin and box thread engagement. This tendency is offset by causing more elastic deformation to occur at the ends of the pin and box providing a more even engagement load distribution along the length of the thread.

A third advantage is that the tolerancing of the joint tapers ensures maximum fatigue strength. Since there is always a manufacturing tolerance on the joint tapers, it would normally be possible for the box to have a slightly greater taper than that of the pin or vice versa. However, the tolerances are set to ensure that regardless of the manufactured result, the pin taper will be the same or slightly greater than the box taper. This places the greatest amount of interference fit at the base of the pin where the critical tension section is located. A standard "Modified Goodman" diagram shows that fatigue strength under alternating stress decreases with increasing mean tensile stress. With tolerancing of the tapers, this invention acts to minimize the amount of alternating stress at the maximum tension section and thus maximizes the fatigue strength and deviation capacity of the joint. It is desirable to have joint deviation capacity to be able to bend the drill string in order to change direction of the bore hole.

The box and pin threads W and T are generally classified as a tapered, modified buttress thread form wherein the angles 30 and 31 of the pressure flanks 22 and 23 respectively are small and the angles 40 and 41 of the clearance flanks 19 and 18 are comparatively large. Further, the box and pin threads have crests 32 and 33 and roots 34 and 35 respectively. The crest of the box thread has a frustoconical surface extending the helical length thereof axially intermediate the box cylinder sections, the generatrix of which is a straight line that is tapered relative to tubing central axis C—C while the root of the box thread likewise has a frustoconical surface that is similarly tapered relative to the tubing central axis. Similarly, the crest of the pin thread has a frustoconical surface extending the helical length thereof, axially intermediate the pin cylinder sections, the generatrix of which is a straight line that is tapered relative to the tubing central axis while the root of the pin thread has a frustroconical surface, the generatrix of which is a straight line that is tapered relative to the tubing central axis. Preferably, the tapers of the pin and box thread frustoconical surfaces are within the range of the thread previously set forth.

The outer diameter of the cylinder section 12, including the crest of the pin thread, is substantially constant along the axial length thereof axially intermediate the shoulder 12A and dotted line 12B, other than for the circumferential portion 23A of the pin thread formed therein. Further, the outer diameter referred to in the preceding sentence is significantly greater than the outer diameter of cylinder section 11. Similarly, the inner diameter of the cylinder section 14, including the crest of the box thread is substantially constant along the axial length thereof axially intermediate the shoulder 14A and dotted line 14B, other than for the circumferential portion of the box thread formed therein.

Further, the inner diameter referred to in the preceding sentence is significantly smaller than the inner diameter of cylinder section 13.

When the joint is made up, the pin threaded portion 23A is radially aligned with the box cylinder section 13 while the corresponding box threaded portion is or will be generally radially aligned with the pin cylinder section 11.

The respective depth 27 and 28 of the pin and box threads axially intermediate the cylinder sections are proportional to the tubing wall thickness. Advantageously, for thin wall drill rods, the depth of each of the box and pin threads is in the range of about 10-15% of the drill rod main wall body thickness when the drill rod is not of an upset type. Further, each of the box and pin thread depths is substantially constant along their entire helical lengths from one cylinder section to the axial opposite cylinder section (along substantially the entire helical dimension of the thread between said sections) of the respective box and pin in contrast to vanishing type threads.

The pressure flank angles are negative and since the pressure flank surfaces are connected to the root surfaces in tension, the root-flank intersections are filleted at 57 and 75 about 0.0035" to 0.009".

Due to the pressure flank angle on any thread form, radial loads are induced as a component of the normal force acting between mated pressure flanks. By incorporating a negative flank angle in the joint, the induced radial loads "compress" the box and pin together, whereas radial loads induced from a positive flank angle "push" the box and pin apart and results in increased wear and thread jumping. The magnitude of the radial load component is equal to the tangent of the pressure flank angle (measured from the perpendicular to the rod axis C—C) times the axial joint load. Thus, the smaller the pressure flank angle, the smaller the induced radial component. With the negative pressure flank angles, the greater the tension load transferred through the joint, the more the pin and box are pulled together and the greater is the torque resistance to spin-out and the greater is the resistance to joint parts belling (buckling) splitting and thread turns jumping over one another.

It is preferred that the pressure flank angle be between about a −7.5 degrees to about a −15 degrees. A smaller minimum negative flank angle would not provide sufficient flank material to handle radial loads or offset wear over small thread depths, nor provide sufficient radial box/pin stability for thinner-wall tubing. A greater maximum negative flank angle would produce excessively large radial components which limit the drilling depth capacity. By using a negative flank angle, the increased wear and the thread jumping associated with boxes pushed out by positive flank angles is eliminated. Also, with the negative flank angles, the threads will remain engaged under significant overloading which is required to retrieve stuck drill strings or valuable in-the-hole tools from deep holes.

To facilitate the ease of making up a joint, the clearance flank angle 40 of the box and the clearance angle 41 of the pin is of a minimum of about 45 degrees. Further, when the joint is made up, there is about a 0.010" axial clearance between the pin and box clearance flanks. With there being a clearance between the clearance flanks when the joint is made up, there is provided a relief passage for pressurized lubricant or debris. By having the clearance flank angle 45 degrees or greater (for example about 45 to 60 degrees) and providing a clearance between the clearance flanks, the radial impact component is greater which deflects the pin into alignment and thereby during make-up when the pin is mis-aligned allows axial motion into the box to continue. If the clearance flank were less than 45 degrees, the impacting clearance flank would is steeper and the axial component of the impact normal force would be significantly greater than the radial component, and the axial motion of the pin would be absorbed by the box or reversed by the impact and the operator would have to reinsert the pin for make-up.

Each of the thread turns is of the same axial dimension Y while the axial dimension X of a thread root (distance from the intersection of straight line extensions of a pressure flank with the frustoconical surface of the thread root to the intersection of straight line extensions of the frustoconical surface of the clearance flank with the frustoconical surface of the thread root) is less than one half than the axial dimension Y. Further, the axial dimension F of a thread clearance flank of the threads from the intersection of crest frustoconical surface with chamfer 48 to the intersection of the frustoconical surface of the thread root with a straight line intersection of the frustoconical surface of the clearance flank is advantageously about 20 to 25 percent of dimension X. These dimensions in conjunction with the profile of the thread clearance flanks provide an axial gap between the clearance flanks. However, axial dimensions of the box and pin crests and roots for each of the thread turns remain substantially constant axially intermediate of the respective set of the cylinder sections.

Also, the negative flank angle provides for lower stress states in the joint which provides significantly higher drilling capacity when compared to a positive flank angle joint. Radial load components induce hoop compression ($-\sigma_y$) in the box and hoop tension ($+\sigma_y$) in the pin. Since the box is in compression ($-\sigma_x$) and the pin is in tension ($+\sigma_x$), the middle term in the Von Mises stress formula, below, is positive and decreases the maximum stress. Conversely, a positive flank angle would increase the maximum stress.

Von Mises stress formula:

$$\sigma_{MAX} = (\sigma_x^2 + \sigma_y^2 - \sigma_x\sigma_y + \tau_{xy}^2)^{1/2}$$

Wherein the $\sigma_x$ is the axial stress, $-\sigma_y$ is the tangential stress, $\tau_{xy}$ is the torsional stress.

The depth of each pin crest relative to that of the box crest is sufficiently greater such that when the joint is made up, the pin thread crests have an interference fit with the box thread root along the length of the thread intermediate the cylinder sections. This fit induces an interference contact pressure, commonly referred to as a "press-shrink fit". However, the relative depths of the box and pin crests is such that the box thread crests are radially spaced from the pin thread roots. By providing the interference fit, there is obtained a rigid joint that maximizes fatigue strength and galling resistance by resisting relative movement between the box and pin which results from alternating stresses caused by drilling in deviated or bent holes. Also, the frictional force offered by the contact pressure between the pin and box threads provides an additional torsion transfer path to prevent over-torquing or over make-up of the joint and a resistant torque against "spin-out" of the joint under rotational deceleration resulting from discontinuing the rotary drive to the drill string at the drill drive surface.

Advantageously, each pin pressure flank is joined to the adjacent pin crest by a chamfer 47 and each pin clearance flank is joined to the adjacent pin crest by a chamfer 48. Each of the chamfers 47 and 48 may be at angles 49 and 50 of about 30 degrees relative to the pin crest while the radial component 52 of each of chamfers 47 and 48 may be about one-tenth of the pin thread depth 28. Further, each pin clearance flank is joined to the adjacent pin root by a radius 55 which may be about 0.025"–0.040".

Further, it is desirable that each box pressure flank is joined to the adjacent box crest 32 by a chamfer 72 at an angle 71 which may be about 30 degrees, and is joined to the adjacent clearance flank 18 by a radius 73 which may be about 0.025" 0.040". The box clearance flank is joined to the adjacent root 34 by radius 74 and is joined to the adjacent pressure flank 22 by radius 75.

Advantageously, the portion of the crest of the pin thread that is further radially outwardly of the central axis C—C than the radii portions 55 and 57 is hardened while the remaining part of the pin thread and box thread are not correspondingly hardened.

With joints of this invention, the joint rigidity and resistance to spin out increases in magnitude with increasing hole depths instead of decreasing such as occurs with positive angle pressure flank joints. That is, with negative pressure flanks, upon make-up of the joint, the mated threads are induced with a radial load equally opposing and maintaining the interference pressure. When additional radial load components are induced from an increased axial load (for example from increasing the length of the drill string), the pin-box interference pressure increases to equally oppose the radial loading. As a result, the rotational deceleration required to cause joint spin-out increases.

The amount of interference is measured by the "stand-off" gap 42 (axial spacing) between the outer shoulders 12A and 13A of the joint in a "wrench-snug" condition, from which the actual interference can be determined by multiplying the stand-off gap by the tangent of the joint taper angle. The wrench snug condition is that when the initial amount of torque makes up the joint to the point when the pin crests are first in contact with the box roots but before there is an interference fit. The joint is made-up and interference pressure is developed when the gap is closed by a recommended make-up torque pre-load, but prior to drilling. The magnitude of the contact pressure developed by the interference fit varies as the inverse square of the diameter of the interface between the pin crests and box roots. As a result, the amount of interference must be reduced in smaller rod tubing sizes to prevent excessive stresses from reducing joint or thread strength and increased in larger rod tubing to develop sufficient pressures.

Within the preferred joint tapers when the joint is pre-torqued, the preferred stand-off gap 42 between the pin shoulder and the box nose shoulder surface is about 0.010" to 0.050" with the minimum being required for a low interference pressure on the smallest rod size without increasing the potential for spin-out while maintaining a measurable gap for manufacturing or gauging purposes while the larger gap is required for larger tubing sizes to develop sufficient interference pressure to offset the inherently greater potential for spin-out. A stand-off gap 43 is provided between the pin nose shoulder 11A and the box base shoulder 14A and always larger than the gap 42. When the joint taper is below the preferred range of taper, a proportionally higher amount of stand-off is required to achieve the same amount of interference. For example, for half of the specified minimum taper angle, twice the stand-off is required to create the same amount of interference.

For mineral exploratory tubing of this invention, it is desirable that the thread pitch be about 2.5 to 4.5 tpi (threads per inch), it being preferred that the pitch be about 3 tpi, except for the smallest (lightest) rod sizes which have 4 tpi to compensate for the smaller circumference, and about 2.5 tpi for larger (heavier) casing sizes to improve robustness. With higher pitches, a finer thread has less robustness in that it is more difficult to make up a joint due to the smaller helix angle, leading to thread damage from cross threading and thread jamming; and also interference fit surface area decreases while thread shear stresses and bending stresses increase.

Lower thread pitches have four main disadvantages as follows: (1) due to a larger helix angle, there is less resistance to spin-out, (2) a longer joint is required to maintain a given thread length which reduces allowable joint taper and thread engagement equalization, (3) the required cylinder section length is larger which increases the likelihood of undesirable increase of induced bending stresses, and (4) the relationship to "critical tension section". The critical tension section is the axial part of the pin which determines the tension capacity of the joint before there is a shearing of threads or axially extending splits of parts of the joint or other undesirable damage to the joint. The thickest section of the threaded portion of the pin ultimately receives the greater part of the tension load due to the strain imparted to the thinner sections. The equivalent section of the box is always larger and is always under a lesser tension load and is therefore not critical. The critical pin tension section is defined as the section located at an axial distance that is one half of the thread pitch from the base (part of thread axially most closely adjacent to pin shoulder 12A) of the threaded portion of the pin. Thus, since the threaded portion is tapered, a lower thread pitch produces a smaller critical tension section than a higher thread pitch.

Desirably the thread length axially between the cylinder sections is about 3.0 to 4.0 circumferential lengths (three to four 360 degree helical turns) for a drill rod and 3.5 to 4.5 circumferential lengths for casings. That is, in order to provide sufficient engagement of the pin and box threads to support the tension load at the rated drilling depth of the joint, a minimum thread length is required. The tension load increases with the weight of larger diameter tubing of equal wall thickness and equal rated drilling depth. However, at a certain pitch, the required number of circumferential lengths (thread turns) remains approximately constant with increasing tubing diameters. Exceeding the desired thread length increases the joint length which decreases allowable joint taper.

The wall thickness of the pin on the axial opposite side of the shoulder 12A from the pin thread and closely adjacent to the shoulder 12 and the box on the axial opposite side of the shoulder 14A from the box thread and closely adjacent to the shoulder 14 for drill rod tubing ranges from 0.14" to 0.26" and for casing tubing, ranges from about 0.17" to 0.26". As a result, the maximum overall drill rod joint length allowable for this invention is preferably is about 1.9 inches which is determined as follows:

Max. Length equals Max. thread pitch×[1.2+(Max. Circumferential Lengths+0.5)×COSINE(Min. pin taper)], where wall thickness is equal or greater than [(Max. Circumferential Lengths+0.5)×SIN(Min. pin taper)+ cylinder section wall thickness], and where the "1.2" accounts for the length of the cylinder sections, the "0.5" accounts for the half-circumferential length to begin the thread, and "Max. thread pitch" means minimum threads per inch.

The maximum number of circumferential thread lengths (thread turns) is limited by the wall thickness of the box and pin ends of the tubing before forming the cylinder sections and threads in that for a given cylinder section thickness and a given thread depth over a given joint taper, only a certain number of thread turns will fit.

Similarly, with reference to the joints of this invention, the maximum overall casing joint length is limited to about 2.7 inches. Usually the outer diameter of drill rods and casings used in the mineral exploratory industry is in the range of about 1.75" to 5.5".

Even though the joint has been described herein with reference to drill rods and casings, it is to be understood the joint may be used on drilling tools as diamond bits, for example a bit end portion that is connected to a drill rod, or connectors, or subs to other joint styles or sizes, or hoisting tools.

Drill tubing (rods and casing) joints of this invention have optimized geometry to half the induced stresses in order to double the joint load capacity when compared with positive flank designs presently made by applicant's employer.

What is claimed is:

1. A joint having a central longitudinal central axis, comprising axially extending first and second members, the first member being tubular and having a female tubular end part, said female tubular end part at least in part defining an annular box having an annular base cylinder section, an axially opposite terminal annular end cylinder section having a larger internal diameter than the box base section and an internal box helical thread extending longitudinally between the box base section and the box end section and being of a constant pitch axially between said box sections and the second member having an axial extending male part, said male part at least in part defining a pin having a pin terminal end cylinder section axially extendable into the box base section, an axially opposite base cylinder section extendable into the box terminal end section and an external helical thread extending longitudinally between the pin base and end sections for threadingly engaging the box thread and being of a constant pitch axially between said pin sections, the box and pin threads each being tapered and having a root, a crest, a pressure flank and a clearance flank, each of the crests and roots having a frustoconical surface, the generatrix of box crest and root surfaces being straight lines inclined relative to the longitudinal axis, the generatrix of the pin frustoconical crest and root surfaces being straight lines inclined relative to the longitudinal axis, the angle of taper of the threads being 0.5° to 1.6° relative to a central axis, the box and pin pressure flanks having negative flank angles of 7.5 to 15 degrees relative to a perpendicular to the central axis, the box and pin clearance angles being of positive angles of at least 45° relative to a perpendicular to the central axis, the box end section having a predominantly radially extending terminal shoulder and a substantially circular cylinder, axial internal surface extending axially from the box thread to closely adjacent to the box shoulder and the pin end section having a predominantly radially extending terminal shoulder and a substantially circular cylinder, axially extending external surface extending from the pin thread to closely adjacent to the pin shoulder, each of the threads being of a pitch of 2.5 to 4.5 threads and the axial length of each of the cylinder sections is about 0.15" to 0.25".

2. The joint of claim 1 wherein the second member is tubular and each of the first and second member has a wall thickness axially opposite and adjacent to the respective base shoulder from the cylinder section that is about 0.14" to 0.26".

3. The joint of claim 1 wherein each of the first and second members is a drill rod and the box and pin are each of a maximum axial length of about 1.9" and each thread has 3 to 4 360 degree helical turns between the cylindrical surfaces and the thread taper is a minimum 0.75°.

4. The joint of claim 1 wherein the box is of an outer diameter of 1.75" to 5.5".

5. The joint of claim 1 wherein each of the first and second members is a casing; each of the box and pin is of a maximum axial length of 2.7" and the thread taper is a minimum 0.75°.

6. A thin wall drill rod and casing joint for mineral exploratory drilling that has a longitudinal central axis, comprising a first tubular member having a box of an outer diameter of 1.75" to 5.5" and a second tubular member having a pin coupleable to the box, said box and pin each including a first annular section having a terminal annular end shoulder, a second annular section having an annular base shoulder axially opposite the terminal end shoulder and a tapered thread axially extending between the first and second sections to cooperate with the thread of the other to threadingly couple the box and pin to one another, each of the shoulders being tapered at an angle of 5 degrees to 10 degrees relative to a perpendicular to the central axis, each of the box and pin sections having radially inner and outer surfaces, the radial spacing of the box end sections inner and outer surfaces from the box end shoulder being less than 15 percent of the radial dimension of the box end shoulder, the radial spacing of the pin end section inner and outer radial surfaces from the pin shoulder being less than 15 percent of the radial dimension of the pin end shoulder, each of the box and pin threads having a root, a crest, a pressure flank, a clearance flank and helical opposite first and second ends, the pin and box threads being of a substantially constant taper and of the same taper between the first section and the second section, the threads being of substantially constant depths between the first section and the second section, each of the box and pin root and crest having a frustoconical surface that is tapered at angle of 0.5 degrees to 1.6 degrees relative to the central axis, each of the pressure flanks having a helical tapered surface abuttable against the helical tapered surface of the other flank that is of a negative flank angle of 7.5 degrees to 15 degrees relative to a perpendicular to the central axis.

7. The joint of claim 6 wherein the box and pin threads are of relative depths that the box thread crests are radially spaced from the pin thread roots and the threads are of a thread pitch of 2.5 to 4.5 threads/inch.

8. A joint having a central longitudinal central axis, comprising axially extending first and second members, the first member being tubular and having a female tubular end part, said female tubular end part at least in part defining an annular box having an annular base cylinder section, an axially opposite terminal annular end cylinder section having a larger internal diameter than the box base section and an internal box helical thread extending longitudinally between the box base section and the box end section and being of constant pitch axially between said box sections and the second member having an axially extending male part, said male part at least in part defining an annular pin having a pin terminal end cylinder section axially extendable into the box base section, an axially opposite base cylinder section extendable into the box terminal end section and an external helical thread extending longitudinally between the pin base and end sections for threadingly engaging the box thread and being of a constant pitch axially between said pin sections, the box and pin threads each being tapered and having a root, a crest, a pressure flank and a clearance flank, each of the crests and roots having a frustoconical surface, the generatrix of box crest and root surfaces being straight lines inclined relative to the longitudinal axis, the generatrix of the pin frustoconical crest and root surfaces being straight lines inclined relative to the longitudinal axis, the angle of taper of the threads being 0.5° to 1.6° relative to a central axis, the box and pin pressure flanks having negative flank angles of 7.5 to 15 degrees relative to a perpendicular to the central axis, the box and pin clearance angles being of positive angles of at least 45°, the box end section having a predominantly radially extending terminal shoulder and a substantially circular cylinder, axial internal surface extending axially from the box thread to closely adjacent to the box shoulder and the pin section having a predominantly radially extending terminal shoulder and a substantially circular cylinder, axially extending external surface extending from the pin thread to closely adjacent to the pin shoulder, the box having an external cylinder surface radially opposite the box end section cylinder internal surface, the pin having an internal cylinder surface radially opposite the pin end section cylinder external surface, the shoulders being tapered relative to a perpendicular to the central axis, the combined radial spacing of the cylinder external and internal surfaces from the adjacent shoulder of each of the pin and box sections being less than 15% of the shoulder dimension that is tapered at the same angle as the shoulder, the box internal cylinder terminal end section being of a constant diameter for at least 90 percent of its axial length and the pin external cylinder terminal end section being of a constant diameter for at least 90 percent of its axial length.

9. A thin wall drill rod and casing joint for mineral exploratory drilling that has a longitudinal central axis, comprising a first tubular member having a box and a second tubular member having a pin coupleable to the box, said box and pin each including a first annular section having a terminal annular end shoulder, a second annular section having an annular base shoulder axially opposite the terminal end shoulder and a tapered thread axially extending between the first and second sections to cooperate with the thread of the other to threadingly couple the box and pin to one another, each of the shoulders being tapered at an angle of 5 degrees to 10 degrees relative to a perpendicular to the central axis, each of the box and pin threads having a root, a crest, a pressure flank, a clearance flank and helical opposite first and second ends, the pin and box threads roots being of a substantially constant width between the first section and the second section, the threads being of substantially constant depths between the first section and the second section, each of the box and pin root and crest having a frustoconical surface that is tapered at an angle of 0.75 degrees to 1.6 degrees relative to the central axis, each of the pressure flanks having a helical tapered surface abuttable against the helical tapered surface of the other flank that is of a negative flank angle that is 7.5 degrees to 15 degrees relative to a perpendicular to the central axis, each of the first and second sections having axially extending diametric internal and outer cylinder surfaces, the first sections being of substantially constant inner diameters for at least 90 percent of their axial lengths, and the clearance flanks being axially spaced from one another.

10. A tubing joint comprising an annular pin member having a terminal end section having a frustoconical end shoulder, a base section having a frustoconical base shoulder axially remote from the pin end shoulder, a single start, tapered, longitudinally extending helical pin thread extending axially between the pin sections, and a box member, said pin and box member having a central longitudinal axis, said box member having a terminal end section having a frustoconical end shoulder, a base section having a frustoconical base shoulder axially remote from the box end shoulder, a single start, tapered, longitudinally extending helical thread extending axially between the box sections, the angle of the box and pin threads being of substantially the same taper and being tapered at an angle of 0.75 to 1.6 degrees relative to the central axis, each of the box and pin threads having a crest, a root, a negative pressure flank and a clearance flank, each of the pressure flanks being of a negative flank angle of 7.5 to 15 degrees relative to a perpendicular to the central axis, the pin and box threads being of relative depths that the pin thread crest are in an interference fitting relationship with the box thread root intermediate the first and second sections and the box thread crest is in radial spaced relationship with the pin thread root along the length of the thread intermediate the first and second sections and the box and pin clearance flanks being in axial spaced relationship, each of the shoulder surfaces being tapered at an angle of 5 degrees to 10 degrees relative to a perpendicular to the central axis, each of the box and pin sections having inner cylinder and outer cylinder surfaces, the radial spacing of the box end sections inner and outer cylinder surfaces from the box end shoulder being less than 15 percent of the radial dimension of the box end shoulder, the radial spacing of the pin end cylinder section inner and outer surfaces from the pin shoulder being less than 15 percent of the radial dimension of the pin end shoulder, and each of the pin and box has a wall thickness axially opposite and adjacent to the respective base shoulder from the cylinder end section that is 0.14" to 0.26".

11. A thin wall drill rod and casing joint for mineral exploratory drilling that has a longitudinal central axis, comprising a first tubular member having a box and a second tubular member having a pin coupleable to the box, said box and pin each including a first annular section having a terminal annular end shoulder, a second annular section having an annular base shoulder axially opposite the terminal end shoulder and a tapered thread axially extending between the first and second sections to cooperate with the thread of the other to threadingly couple the box and pin to one another, each of the shoulders being tapered at an angle of 5 degrees to 10 degrees relative to a perpendicular to the central axis, each of the box and pin threads having a root, a crest, a pressure flank, a clearance flank and helical opposite first and second ends, the pin and box threads roots being of a substantially constant width between the first section and the second section, the threads being of substantially constant depths between the first section and the second section, each of the box and pin root and crest having a frustoconical surface that is tapered at angle of 0.5 degrees to 1.6 degrees relative to the central axis, each of the pressure flanks having a helical tapered surface abuttable against the helical tapered surface of the other flank that is of a negative flank angle of 7.5 degrees to 15 degrees relative to a perpendicular to the central axis, the box and pin threads being of relative depths that the box thread crests are radially spaced from the pin threads-and the threads are of a thread pitch of 2.5 to 4.5 threads/inch, the clearance flanks being 45 to 60 degrees relative to the crests, each of the box and pin is of a maximum axial length of 2.7", and each of pin and box has a wall thickness axially opposite and adjacent to the respective base shoulder from the respective thread and closely adjacent to the shoulder of 0.14" to 0.26".

12. The joint of claim 11 wherein the pin first and second annular sections respectively have external first and second substantially cylindrical surfaces and the box first and second annular sections respectively have internal first and second substantially cylindrical surfaces and each thread has 3 to 4.5 360 degree helical turns between the cylinder surfaces of the respective pin and box.

13. The joint of claim 11 wherein the first and second tubular member each includes a tubular main body having the box and pin respectively joined thereto, the depth of each of the box and pin threads is 10 to 15 percent of the main body wall thickness and the axial length of the pin is 0.002" to 0.004" shorter than that of the box.

14. A tubing joint comprising an annular pin member having a terminal end section that has a frustoconical end shoulder, a base section that has a frustoconical base shoulder axially remote from the pin nose shoulder, a single start, tapered, longitudinally extending helical pin thread extending axially between the pin sections, and a box member, said pin and box members having a central longitudinal axis, said box member having a terminal end section having a frustoconical end shoulder axially remote from the box end shoulder, and a single start, tapered, longitudinally extending helical box thread extending axially between the box sections, the angle of the box and pin threads being of substantially the same taper and being tapered at an angle of 0.75 to 1.6 degrees relative to the central axis, each of the box and pin threads having a crest, a root, a pressure flank and a clearance flank, each of the pressure flanks being of a negative flank angle of 7.5 to 15 degrees relative to a perpendicular to the central axis, the clearance flanks being 45 to 60 degrees relative to the crests, the threads being of a pitch of about 2.5 to 4.5 threads per inch, each of the sections being cylindrical, each of the threads having 3 to 4.5 360 degree helical turns between the cylinder sections of the respective box and pin and the wall thickness adjacent to and axially opposite the respective base shoulder from the thread being 0.141" to 0.26".

\* \* \* \* \*